United States Patent [19]

Fally

[11] Patent Number: 5,507,576
[45] Date of Patent: Apr. 16, 1996

[54] BICHROMATIC PYROMETER

[75] Inventor: Jacques Fally, Orsay, France

[73] Assignee: European Gas Turbines SA, Paris, France

[21] Appl. No.: 220,020

[22] Filed: Mar. 30, 1994

[30] Foreign Application Priority Data

Apr. 1, 1993 [FR] France .................... 93 03848

[51] Int. Cl.$^6$ .................... G01J 5/08; G01J 5/30; G01J 5/60
[52] U.S. Cl. .................... 374/127; 374/131; 374/153; 356/45
[58] Field of Search .................... 374/127, 131, 374/144, 153; 356/45

[56] References Cited

U.S. PATENT DOCUMENTS

| | | | |
|---|---|---|---|
| 2,237,713 | 4/1941 | Russell | 356/45 |
| 3,435,237 | 3/1969 | Collins | 374/127 |
| 3,611,805 | 10/1971 | Nishikari | 374/127 |
| 3,715,922 | 2/1973 | Menge | 374/127 |
| 3,922,550 | 11/1975 | Crowley et al. | 374/127 |
| 3,992,943 | 11/1976 | Schiefer et al. | 356/45 |
| 4,326,798 | 4/1982 | Kahn | 374/127 |
| 4,692,025 | 9/1987 | Tani et al. | 356/45 |
| 4,764,025 | 8/1988 | Jensen | 374/127 |
| 4,765,752 | 8/1988 | Beynon et al. | 356/45 |
| 4,797,006 | 1/1989 | Masom | 356/43 |

FOREIGN PATENT DOCUMENTS

| | | |
|---|---|---|
| 0218157A2 | 4/1987 | European Pat. Off. . |
| 0335224 | 10/1989 | European Pat. Off. .................. 356/45 |
| 2365108 | 4/1978 | France . |
| 0046436 | 4/1981 | Japan ..................................... 374/127 |
| 0077728 | 6/1981 | Japan ..................................... 374/127 |
| 0153228 | 9/1982 | Japan . |
| 0052532 | 3/1983 | Japan ..................................... 356/45 |
| 2183028 | 5/1987 | United Kingdom . |

OTHER PUBLICATIONS

Japanese Patent Abstract JP 61225626 dated Jul. 10, 1986.

*Primary Examiner*—Diego F. F. Gutierrez
*Attorney, Agent, or Firm*—Sughrue, Mion, Zinn, Macpeak & Seas

[57] ABSTRACT

A bichromatic pyrometer for detecting the high temperature of a surface element of an object comprises two photodiodes (18, 19) receiving radiation from the object, each of the photodiodes having a large forbidden band and being sensitive to radiation in a given range of wavelengths, said sensitivity ranges being different and being situated in the visible or near visible regions of the spectrum, said ranges being obtained by selecting the value of the forbidden band of the material constituting each of the photodiodes (18) and (19), said forbidden band being greater than or equal to that of silicon ($\geq 1.11$ eV). The pyrometer is capable of measuring rapidly changing surface temperatures with great accuracy.

6 Claims, 1 Drawing Sheet

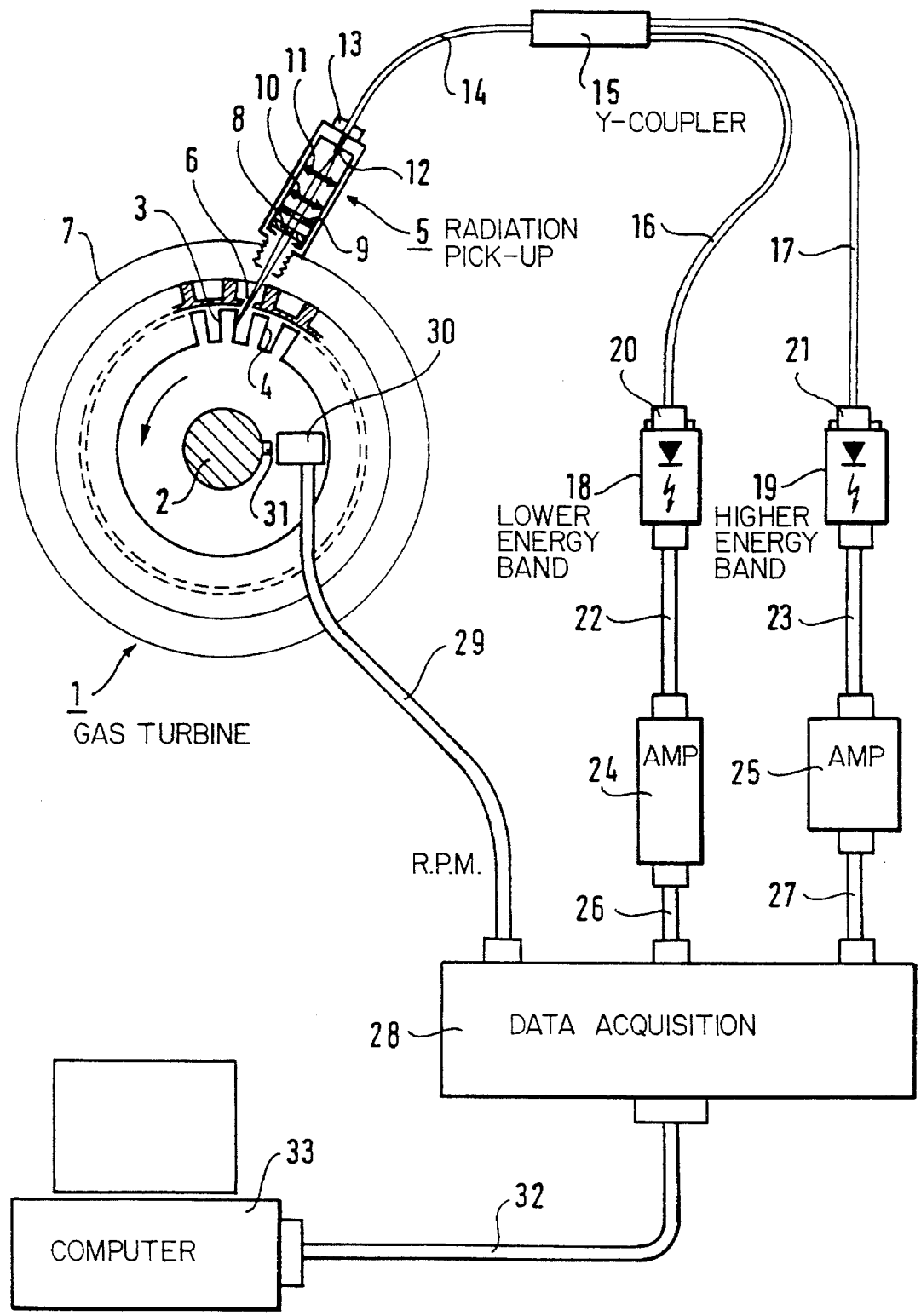

BICHROMATIC PYROMETER

BACKGROUND OF THE INVENTION

The present invention relates to a bichromatic pyrometer for detecting the high temperature of a surface element of an object.

The present invention applies more particularly, but not exclusively, to measuring the temperatures of gas turbine blades rotating at very high speed. The turbines may be industrial turbines or aviation turbines.

DESCRIPTION OF THE PRIOR ART

The high temperatures of surface elements of turbines rotating at very high speeds have previously been measured by means of monochromatic pyrometers which generally operate in the infrared range. However, the monochromatic pyrometers give very inaccurate indications of temperature that are highly influenced by the emissivity of a surface to be observed. The emissivity is generally unknown varies with time. The inaccuracies are also influenced by darkening of the observation porthole and by interfering reflections of radiation from the flame. All of this results in a margin of error that may be as great as about 100° C. for turbine blades with temperatures in the range 800° C. to 900° C.

Proposals have also been made to measure the temperatures of turbine blades by determining the ratio of luminances received by two photodiodes. According to Document GB-A-2 183 038, the radiation emitted by a turbine blade is transmitted to a first photodiode made of silicon. The first photodiode is responsive to radiation at wavelengths lying in the range 0.4 micrometers (μm) to 1.05 μm. Radiation at wavelengths in the range 0.8 μm to 1.8 μm is allowed to pass to a second photodiode made of indium and gallium arsenide. The temperature of the turbine blades is thus measured with better accuracy. However error calculation performed on the value of the ratio of the luminances transmitted using Wien's approximate formula shows that the temperature error on the basis of the measured values is equal to the sum of a first term corresponding to the error in luminance measurement and of a term corresponding to the error on variation in emissivity between the equivalent operating wavelengths of the two photodiodes. These two terms include in the numerator the product of the two wavelengths. The first term includes in its denominator the difference between the two wavelengths. To reduce the error, it would be most advantageous to make use of photodiodes that are responsive to short wavelengths, and to use two wavelengths that are as different as possible. Nevertheless, it is very difficult to perform measurements on photodiodes that are responsive to short wavelengths. This is due to the fact that at the temperatures commonly involved, the emittance of a black body or of a gray body decreases with decreasing wavelength, particularly in the visible spectrum (as demonstrated by Planck's law). Additionally, known amplifiers having very high gain also have a narrow passband and a high level of noise.

SUMMARY OF THE INVENTION

An object of the present invention is to provide a bichromatic optical pyrometer enabling the high surface temperature of an object to be determined with a margin of error that does not exceed a few degrees C. An additional object is to, where necessary, perform successive measurements at a high rate on the surfaces of objects that are moving quickly, such as the blades of a turbine.

The bichromatic pyrometer of the invention is characterized in that the forbidden band of the semiconductor material of one of the photodiodes is greater than that of the other which is itself greater than or equal to that of silicon.

The bichromatic pyrometer comprises:

a) an optical element for detecting radiation emitted by the surface element;

b) an optical fiber system for transmitting the detected radiation to two photodiodes, each being made of a semiconductor material having a large forbidden band and sensitive to radiation in a given range of wavelengths, said sensitivity ranges being different; and c) downstream from each of said photodiodes and in parallel, means for transmitting the electrical signals that result from the light energies received by each of the two photodiodes, and means for responding to said electrical signals. For a semiconductor material, it is known that, the cutoff wavelength $\lambda c$ (the wavelength above which it no longer absorbs electromagnetic radiation) and its equivalent wavelength $\lambda eq$ (close to the maximum wavelength of its spectrum response) are defined as a function of the forbidden band Eg by the following relationships:

$\lambda c$ (in micrometers)=1.24/Eg (in electron volts); and $\lambda eq$ is close to 0.8 $\lambda c$.

As a result, the cutoff wavelength of the material of the first photodiode and its equivalent wavelength are less than those of silicon. Additionally, the corresponding wavelengths of the material of the second photodiode are less than or equal to those of silicon.

Thus, since the forbidden band of silicon is 1.11 eV, its cutoff wavelength is 1.12 μm and its equivalent wavelength is 0.924 μm.

Thus, for example, one of the photodiodes may be made of a material having a forbidden band that is considerably greater than 1.11 eV, so that its cutoff wavelength and its equivalent wavelength are considerably shorter than 1.12 μm and 0.924 μm, respectively. It would also be possible to use two photodiodes characterized by forbidden bands both greater than 1.11 eV.

In practice, the materials chosen for the photodiodes depends on the intended application. In particular, the materials on the rate at which measurements are to be performed on an emission that varies at high frequency, and on the temperature range of emission from the surface, e.g. high frequency measurement of the temperature of industrial turbine blades, at a temperature of about 850° C., or of aviation turbine blades of a temperature that may be as high as 1100° C., or low frequency measurement of the temperature in a furnace (which is almost stable).

In particular, when measuring temperatures that vary at high frequency, at a measurement rate of the order of 5 microseconds (μs), and when measuring the temperature of elements whose surface temperature is high, around 850° C., such as various points on the blades of industrial turbines passing through the optical beam observed by the pyrometer, then the electrical signals emitted by the photodiodes need to be transmitted by means of high gain current amplifiers (gain equal to or greater than $10^6$ V/A) having a passband of at least 10 kHz.

To measure the temperature of the tips of aviation turbine blades, which temperature may be about 1100° C., it is possible, for example, to use a gallium phosphide photodiode having a forbidden band of 2.22 eV, a cutoff wavelength of 0.556 μm, and an equivalent wavelength of 0.45 μm, while the other photodiode may be made of silicon.

To measure the surface temperature of static objects or to perform measurements at low frequency (less than 1 kHz), there is no need to place high gain amplifiers after the photodiodes. The photodiodes may be replaced by high resistance load resistors.

The optical fiber system for transmitting the radiation detected may comprise a fiber of relatively large diameter (e.g., core diameter equal to 1 mm), connecting the detection optical element to a Y-coupler. The system may also comprise optical fibers of the same diameter in parallel for transmitting the radiation as split by the coupler to each of the photodiodes. The system may alternatively comprise a bundle of optical fibers in parallel and subdivided into two half-bundles, each connected to a corresponding photodiode. Finally, the system may comprise a single bundle of optical fibers connecting the detection optical element to a first photodiode that absorbs the shorter wavelength portion of the radiation while allowing the radiation that is in another range of wavelengths to pass on to a second photodiode which absorbs the transmitted radiation.

Electrical signals emitted by the photodiodes are passed through amplifiers when measuring temperatures at high frequency. The electrical signals are preferably recorded by an electronics card for synchronous and high-speed acquisition and storage of said signals.

By way of example and with reference to the diagrammatic sole figure of the accompanying drawing, there follows a description of a short wavelength fast bichromatic pyrometer for measuring at high frequency the temperatures of the successive tips of blades in a gas turbine.

BRIEF DESCRIPTION OF THE DRAWING

FIG. 1 shows the bichromatic pyrometer in accordance with the invention.

DESCRIPTION OF THE PREFERRED EMBODIMENTS

The pyrometer is designed to measure the temperatures of various points on the surface of inlet blades (or blades in the high pressure stage), such as the blades 3 and 4 of a gas turbine 1 shown in cross section perpendicular to the axis of the turbine. The measurement is performed at very high frequency given the high speed of rotation of the shaft 2 of the turbine (speed of rotation about 5,100 revolutions per minute (rpm)). The inlet blades have a highest surface temperatures, of around 850° C.

To this end, an optical head 5 looks through an orifice 6 passing through the stator portion 7 of the turbine to look at an elementary area of a few mm$^2$ of a blade of the turbine. The angle between the line of sight and the radius of the turbine passing through the measurement point in the plane of the figure should lie in the range 25° to 30°. This makes it possible to perform measurements down to close to the roots of the blades. The optical head 5 includes a sapphire porthole 8 having a sealing ring, a diaphragm 9, a lens 10, a condensing lens 11, and an inlet 12 to an optical fiber 14 that passes through a connector 13.

The optical fiber 14 transmits the light radiation to an optical Y-coupler 15 that is balanced 50%—50%. Optical fibers 16 and 17 lead in parallel from the coupler to photodiodes 18 and 19 mounted in screened housings provided with inlet connectors 20 and 21.

The lefthand photodiode 18 in the FIGURE may be, for example, a high speed "PIN" silicon photodiode, having a forbidden band of 1.11 eV. Its cutoff wavelength in application of the conventional formula has a value of 1.12 μm (1.24/1.11) and its equivalent wavelength is about 0.924 μm. The lefthand photodiode may be constituted, for example, by an arsenic and gallium phosphide photodiode of sensitivity extended towards the red, with a forbidden band of about 1.75 eV, a cutoff wavelength of 0.76 μm, and an equivalent wavelength of 0.686 μm. Such photodiodes are commercially available.

Other materials have forbidden bands that are even greater, for example arsenic and gallium phosphide having limited sensitivity in the visible spectrum, or gallium phosphide. However, their equivalent wavelengths are even smaller, and given the spectral distribution of emission from a black body (or in practice a gray body) as a function of temperature and as given by Planck's law, that would give rise to too little energy in this particular application for measurement to be performed properly using amplifiers that are available on the market.

Photodiodes made of such materials could nevertheless be appropriate for measuring even higher temperatures, temperatures greater than 1100° C., and at a frequency of about 30 kHz.

Downstream from the photodiodes, connections 22 and 23 connect the photodiodes to high gain current amplifiers 24 and 25 (gain of about $10^7$ to about $10^8$ V/A) having passbands of at least 10 kHz. Such amplifiers are commercially available.

The current amplifiers 24 and 25 are connected via connections 26 and 27 to a card for high speed synchronous data acquisition and storage 28.

The card is also connected via a connection 29 to a position detector 30 that is responsive to the passage of a reference 31 secured to the shaft of the turbine. This makes it possible to identify which turbine tip is being looked at while data is being recorded.

The storage and acquisition card is itself connected via a connection 32 to a computer 33 provided with controlling software and with software for calculation and display purposes.

The pyrometer in accordance with the above description makes it possible to measure, at high speed, the temperatures of successive blade tips in a gas turbine (e.g. 2,500 measurements per revolution of the turbine) starting at 700° C. This pyrometer provides an accuracy of ±3° C., for blades having emissivity lying in the range 0.15 to 0.9, and using a passband of 10 kHz. Experimental measurements performed on fixed targets of "Nimonic" alloy have shown that the temperature of the object is a linear function of the logarithm of the ratio of the respective voltages delivered by the amplifiers 25 and 24. This is in compliance with the theory for the phenomenon. If static measurement suffices, then there is no need to place amplifiers downstream from the photodiodes. The amplifiers could be replaced merely by high resistance load resistors (e.g. 500 kΩ).

What is claimed is:

1. A bichromatic pyrometer for performing successive temperature measurements on a succession of surface elements of a surface, said surface being in fast motion relative to said bichromatic pyrometer, wherein temperature radiations emitted by said surface elements pass successively in front of said bichromatic pyrometer and vary at a high frequency temperature variation rate, said bichromatic pyrometer comprising:

an optical element having a sight for detecting said temperature radiations emitted by said surface elements passing successively in front of said sight;

an optical fiber system coupled to said optical element and to a first photodiode and a second photodiode, said optical fiber system having divider means for dividing said detected temperature radiations into a first part and a second part and for transmitting said first part to said first photodiode and said second part to said second photodiode, said first photodiode and said second photodiode being made of a semiconductor material having a large forbidden band, and said first photodiode and said second photodiode being sensitive to radiation in given sensitivity ranges of wavelengths, said forbidden band of said first photodiode being greater than said forbidden band of said second photodiode, said forbidden band of said second photodiode being greater than or equal to the forbidden band of silicon, said sensitivity range of wavelengths of said first photodiode being different from said sensitivity range of wavelengths of said second photodiode, said first photodiode and said second photodiode having a conversion rate in accordance with said high frequency temperature variation rate for converting said first part and said second part of said detected temperature radiations into respective electrical signals without deformations;

amplifier means connected to each of said first photodiode and said second photodiode, said amplifier means having a gain and a passband in accordance with said high frequency temperature variation rate for amplifying said respective electrical signals without attenuation or deformations; and transmitter means for transmitting said respective amplified electrical signals to a recorder means for recording said respective amplified electrical signals.

2. The bichromatic pyrometer according to claim 1, wherein said optical fiber system comprises a main optical fiber coupled to said optical element, a Y-optical coupler having an input connected to said main optical fiber and a first and second output connected to first and second secondary optical fibers, respectively, said first and second secondary optical fibers being identical, said first secondary optical fiber being coupled to said first photodiode and said second secondary optical fiber being coupled to said second photodiode, wherein said first part and said second part are each equal to half of said detected temperature radiations.

3. The bichromatic pyrometer according to claim 1, wherein said amplifier means comprises a first and a second current amplifier, said first current amplifier being coupled to said first photodiode and said second current amplifier being connected to said second photodiode, wherein said first and second current amplifiers have a gain greater than or equal to $10^6$ V/A and a passband greater than 10 kHz.

4. The bichromatic pyrometer according to claim 1, wherein said recorder means comprises a high speed electronic card for simultaneously recording said respective amplified electrical signals of said first photodiode and said second photodiode.

5. The bichromatic pyrometer according to claim 1, wherein one of said first and said second photodiodes is a high speed converter "PIN" photodiode of silicon having an equivalent wavelength of around 0.924 μm, and the other of said first and said second photodiodes is an arsenic and gallium phosphide photodiode having an equivalent wavelength of around 0.686 μm.

6. The bichromatic pyrometer according to claim 1, wherein one of said first and said second photodiodes is a gallium phosphide photodiode having an equivalent wavelength of around 0.45 μm, the other of said first and said second photodiodes is a photodiode having an equivalent wavelength greater than 0.45 μm.

* * * * *